United States Patent Office 3,179,687
Patented Apr. 20, 1965

3,179,687
MIXED SULFITE ESTERS OF AROMATIC GLYCOL ETHERS AND ALIPHATIC GLYCOL ETHERS
Rupert A. Covey, Wolcott, Allen E. Smith, Oxford, and Winchester L. Hubbard, Woodbridge, Conn., assignors to United States Rubber Company, New York, N.Y., a corporation of New Jersey
No Drawing. Filed Jan. 14, 1963, Ser. No. 251,069
6 Claims. (Cl. 260—456)

This invention relates to new chemicals, namely new organic esters of sulfurous acid, more particularly to mixed sulfite esters of aromatic glycol ethers and aliphatic glycol ethers.

The new compounds of the present invention are useful as herbicides. They may also be used as plasticizers.

The chemicals of the present invention may be represented by the general formula

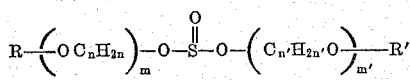

in which R is an aromatic radical, e.g. phenyl, or naphthyl, or a phenyl or a naphthyl (aryl) radical having one or more substituents in the aryl nucleus selected from the group consisting of alkyl having up to 9 carbon atoms, cycloalkyl, haloalkyl, alkoxy and halo; R' is an aliphatic radical ,e.g., alkyl, alkenyl, alkynyl, cycloalkyl, cyanoalkyl, or haloalkyl radical; $n$ and $n'$ are each 2 to 10, and $m$ and $m'$ are each 1 to 10. Where $m$ or $m'$ is greater than 1, the repeating oxyalkyl groups may be the same or different. Examples of R are phenyl, 1-naphthyl, 2-naphthyl, p-tolyl, o-tolyl, isopropylphenyl, tert.-butylphenyl, tert.-amylphenyl, nonylphenyl, cyclohexylphenyl, chloromethylphenyl, methoxyphenyl, and haloaryl having up to 5 halo radicals, e.g. bromophenyl, 2-chlorophenyl, 2-4-dichlorophenyl, trichlorophenyl, pentachlorophenyl. Examples of R' are alkyls having up to 18 carbon atoms, e.g. methyl, ethyl, propyl, isopropyl, butyl, isobutyl, sec.-butyl, tert.-butyl, amyl, hexyl, 2-ethylhexyl, octyl, decyl, isodecyl, dodecyl, hexadecyl, octadecyl, allyl, methallyl, alkynyl radicals having 3 to 10 carbon atoms, e.g. propargyl and 1-(3-nonynyl), cyclohexyl, 2-cyanoethyl, chloroalkyls having up to 5 carbon atoms and up to 3-chloro radicals, e.g. 2-chloroethyl, 2,2,2-trichloroethyl, $\gamma$-chloropropyl, $\delta$-chlorobutyl, $\omega$-trichloroamyl. Examples of the —$OC_nH_{2n}$— and —$OC_{n'}H_{2n'}$— groups are ethyleneoxy, trimethyleneoxy, tetramethyleneoxy, propyleneoxy, isopropyleneoxy, 1,2-dimethylethyleneoxy, octamethyleneoxy.

The preparation of the chemicals of the invention may be carried out by reacting the selected aliphatic glycol ether with the separately prepared chlorosulfinate of the selected aromatic glycol ether as illustrated in reaction (5) below. Such chlorosulfinate may be made by reacting the selected aromatic glycol ether with thionyl chloride as illustrated in reaction (3) below. The aliphatic glycol ether may be made by reacting the selected alcohol, with one to ten moles of the selected alkylene oxide per mole of the alcohol as illustrated in reaction (1) below. Alternatively, the chemicals of the invention may be made by reacting the selected aromatic glycol ether with the separately prepared chlorosulfinate of the selected aliphatic glycol ether as illustrated in reaction (6) below. Such chlorosulfinate may be made by reacting the selected aliphatic glycol ether with thionyl chloride as illustrated in reaction (4) below. The aromatic glycol ether may be made by reacting the selected phenol, with one to ten moles of the selected alkylene oxide per mole of the phenol as illustrated in reaction (2) below. Such preparations are illustrated by the following reactions with the same symbols R, R', $m$ and $m'$ as in the above general formula and for convenience using ethylene oxide ($n=2$) as the alkylene oxide:

(1) 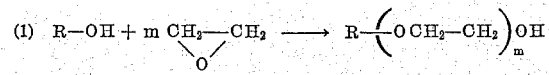

(2) 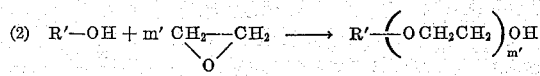

(3) 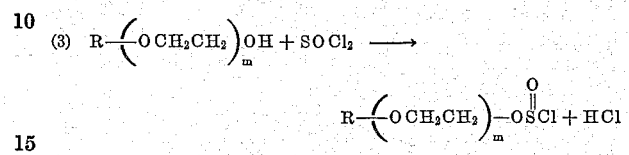

(4) 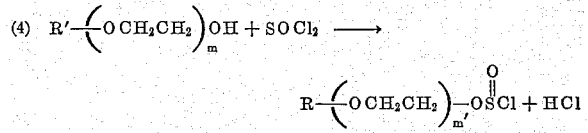

(5) 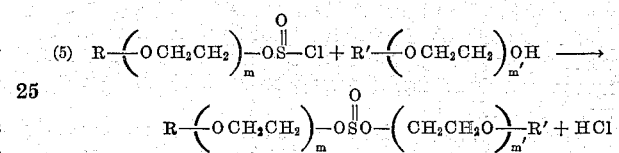

(6) 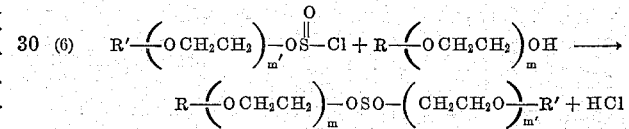

Reaction 1 above is a well known and smooth reaction. With one mole of alkylene oxide per mole of phenol, the result will be substantially a single compound containing one alkylene oxide unit. With two or more moles of alkylene oxide per mole of phenol, a mixture of products having varying numbers of alkylene oxide units is produced. Reaction (2) above is a well known and smooth reaction. With one or more moles of alkylene oxide per mole of alcohol, a mixture of products having varying numbers of alkylene oxide units is produced. If a compound with a specific number of alkylene oxide units is desired, the mixture may be fractionated as shown below.

The following reaction of p-tert.-butyl phenol with propylene oxide is illustrative of the well known preparation of the starting aromatic glycol ethers according to reaction (1) above:

p-tert.-Butyl phenol (300 g., 2.0 moles) and 4 g. sodium hydroxide were combined and the mixture heated to 150° C. Propylene oxide (279 ml., 232 g., 4.0 moles) was added during two hours maintaining the reaction temperature at 150° C.–160° C. The mixture was cooled, the catalyst was neutralized with dilute hydrochloric acid, and the product taken up in benzene. The benzene was removed and the product heated to 90° C. (0.5 mm.) to remove the last traces of volatile materials. The crude reaction mixture weighed 509 g. (95.7%). It was a mixture of compounds having the structure.

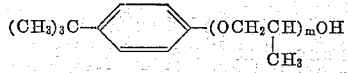

where $m=1$, 2, 3, 4, 5, etc. The mixture was distilled and the following fractions collected:

$m=1$, B.P. 107–128° C. (1 mm.)—32%
$m=2$, B.P. 128–153° C. (1 mm.)—47%
$m=3$, B.P. 163–184° C. (1 mm.)—14%
Residue Center cuts of these fractions yielded the pure compounds as follows:

$m=1$, B.P. 116–120° C. (1 mm.)
$m=2$, B.P. 146–153° C. (1 mm.)
$m=3$, B.P. 175–177° C. (1 mm.)

The following reaction of isopropyl alcohol with propylene oxide is illustrative of the well known preparation of the starting aliphatic glycol ethers acording to reaction (2) above:

Isopropyl alcohol (153 ml., 120 g., 2.0 moles) and 2.4 g. sodium hydroxide were combined and refluxed while 203 ml. (174 g., 3.0 moles) propylene oxide were added during six hours. The temperature of the refluxing solution at the end of the addition was 55° C. Refluxing was continued for eight hours more during which time the reflux temperature rose to 108° C. The mixture was distilled to give 52 g. (44%) isopropoxyisopropyl alcohol, B.P. 147–148° C., 29 g. (16%) diisopropoxyisopropyl alcohol, B.P. 113–127° C. (23 mm.), and 22 g. (9%) triisopropoxyisopropyl alcohol, B.P. 153–163° C. (22 mm.).

The preparation of the chlorosulfinates of the glycol ethers according to reactions (3) and (4) above is carried out at a temperature of between —5° C. and 30° C., preferably near 0° C., and the yield of chlorosulfinate is nearly quantitative. An inert solvent such as benzene, xylene or solvent naphtha may be used. This is illustrated below.

p-tert.-Butylphenoxyisopropyl chlorosulfinate was prepared as illustrated in reaction (3) above as follows:

p-tert.-Butylphenoxyisopropyl alcohol or propylene glycol mono-p-tert. butyl phenyl ether (104 g., 0.5 mole) prepared according to reaction (1) as described above was dissolved in 150 ml. benzene and the solution was cooled to 0° C.–5° C. Thionyl chloride (45.4 ml., 74.4 g., 0.625 mole) was added dropwise during one hour, maintaining the reaction temperature below 5° C. The mixture was allowed to warm to room temperature and stand for 15 hours. The benzene was evaporated under reduced pressure at room temperature and the residue was warmed to 35° C. (0.8 mm.) to remove the last traces of solvent. Yield, 141.3 g. (97.3%) of a pale yellow oil which was nearly odorless and relatively stable when stored in a refrigerator.

Methoxyethyl chlorosulfinate was prepared as illustrated in reaction (4) above as follows:

Thionyl chloride (80.0 ml., 131 g., 1.1 moles) was added dropwise during 0.5 hour to 78.8 ml. (76.0 g., 1 mole) methyl Cellosolve previously cooled to 0–5° C. The temperature during the addition was maintained below 10° C. The reaction mixture was allowed to warm to room temperature and stand for 15 hours. The excess thionyl chloride was removed under reduced pressure and the product distilled; B.P. 85° C. (20 mm.); yield, 144.5 g. (91.2%).

The preparation of the sulfite esters according to reactions (5) and (6) above is carried out in the presence of an HCl acceptor, such as pyridine, dimethyl aniline or trimethylamine, and in a solvent such as benzene, xylene or solvent naphtha. The reaction temperature is generally between —10° C. and 50° C., preferably near 0° C. This is illustrated in Examples I, II and III below.

Examples of the sulfite diesters of the present invention are:

Phenoxyethyl methoxyethyl sulfite
Phenoxyisopropyl methoxyethyl sulfite
Phenoxy-2-butyl methoxyethyl sulfite
Phenoxyisopropoxyisopropyl methoxyethyl sulfite
Phenoxyethoxyisopropyl methoxyethyl sulfite
Phenoxy-2-hexyl methoxyethyl sulfite
o-Toloxyethyl methoxyethyl sulfite
p-tert.-Butylphenoxyisopropyl methoxyethyl sulfite
p-tert.-Amylphenoxyethyl methoxyethyl sulfite
p-tert.-Butylphenoxyisopropoxyisopropyl methoxyethyl sulfite
Phenoxyethyl methoxyisopropyl sulfite
Phenoxyethyl ethoxyethyl sulfite
Phenoxyisopropyl ethoxyethyl sulfite
Phenoxyisopropyl methoxyisopropyl sulfite
Phenoxyisopropyl methoxy-2-butyl sulfite
o-Toloxyisopropyl ethoxy-2-butyl sulfite
p-tert.-Butylphenoxyisopropyl isopropoxyethyl sulfite
Phenoxy-2-butyl isopropoxyethoxyethyl sulfite
p-tert.-Butylphenoxyisopropyl ethoxyethyl sulfite
p-tert.-Butylphenoxyisopropyl n-butoxyethyl sulfite
1-naphthoxyethyl methoxyethyl sulfite
p-Cyclohexylphenoxyethyl methoxyethyl sulfite
p-Chloromethylphenoxyethyl methoxyethyl sulfite
o-Chlorophenoxytriethoxyethyl methoxyethyl sulfite
Phenoxyethyl allyloxyisopropyl sulfite
Phenoxyisopropyl propargyloxyethyl sulfite
Phenoxyethyl cyclohexoxyethyl sulfite
Phenoxyethyl β-cyanoethoxyethyl sulfite
Phenoxyethyl γ-chloropropoxyisopropyl sulfite
3-p-tert.-butylphenoxy-2-butyl cyanoethoxy-2-butyl sulfite
p-Chlorophenoxyethyl methoxy-2-octyl sulfite The following examples illustrate the invention. All parts and percentages referred to herein are by weight.

EXAMPLE I

*Preparation of p-tert.-butylphenoxyisopropyl methoxyethyl sulfite* p-tert.-Butylphenoxyisopropyl alcohol (20.8 g., 0.1 mole), 9.3 ml. (9.1 g., 0.115 mole) pyridine and 50 ml. xylene were combined and the solution was cooled to 0° C. A solution of 18.2 g. (0.115 mole) β-methoxyethyl chlorosulfinate in 50 ml. xylene was added during 20 min., keeping the temperature below 10° C. The mixture was stirred for 15 min. and then washed twice with 25 ml. portions of water. The xylene solution was stirred with 100 ml. 2 N NaOH for one hour and then washed with several portions of saturated salt solution until the last portion was neutral to pH paper. The xylene was removed under reduced pressure and the residue was distilled while the pot temperature for the majority of the distillation was held at 152–156° C. (0.1 mm.). Yield, 28 g. (85%); $n^{20}/D$ 1.5001. *Analysis.*—Calculated for $C_{16}H_{25}O_5S$: C, 58.17; H, 7.90; S, 9.71. Found: C, 58.92, 59.07; H, 8.13, 8.27; S, 9.66.

EXAMPLE II

*Preparation of phenoxyisopropyl methoxyethyl sulfite*

Phenoxyisopropyl alcohol (87.1 g., 0.63 mole), 51.0 ml. (49.9 g., 0.63 mole) pyridine and 400 ml. xylene were combined and the solution was cooled to 0° C. A solution of 100.0 g. (0.57 mole) β-methoxyethyl chlorosulfinate in 250 ml. of xylene was added during two hours keeping the temperature below 10° C. The mixture was stirred for 0.5 hr. and was washed twice with 250 ml. portions of water. The mixture was extracted with 570 ml. of 2 N NaOH. The xylene solution was washed with several portions of saturated salt solution until the last portion was neutral to pH paper. The xylene was removed under reduced pressure and the residue was distilled, giving 127.8 g. (81.3%) yield of viscous liquid; B.P. 131–140° (0.25 mm.), $n^{25}/D$ 1.4818. *Analysis.*—Calculated for $C_{12}H_{18}O_5S$: C, 52.85; H, 6.62; S, 11.70. Found: C, 53.11, 53.02; H, 6.77, 6.51; S, 11.80.

EXAMPLE III

*Preparation of p-tert.-butylphenoxyisopropoxyisopropyl methoxyethyl sulfite* p-tert.-Butylphenoxyisopropoxyisopropyl alcohol (13.3 g., 0.05 mole), 4.7 ml. (4.6 g., 0.058 mole) pyridine and 20 ml. xylene were combined and the solution was cooled to 0° C. A solution of 9.4 g. (0.059 mole) β-methoxyethyl chlorosulfinate in 20 ml. xylene was added during 20 min., keeping the temperature below 6° C. The mixture was stirred for 15 minutes and then washed twice with 25 ml. portions of water. The xylene solution was stirred with 50 ml. 2 N NaOH for one hour and was washed with several portions of saturated salt solution until the last portion was neutral to pH paper. The xylene was removed under reduced pressure and the residue was heated for one hour at 150° C. (0.03 mm.). The residue was slurried with Dicalite (filter-aid) and filtered, giving 15 g. (77.2%) of viscous liquid; $n^{20}/D$ 1.4918. *Analysis.*—Calculated for $C_{19}H_{32}O_6S$: C, 58.74; H, 8.32; S, 8.25. Found: C, 58.96, 58.84; H, 8.29, 8.16; S, 8.14, 8.08.

Sulfur analysis of other chemicals of the present invention were:

Phenoxy-2-butyl methoxyethyl sulfite. Calculated: S, 11.12%. Found: 10.71%.

Phenoxyisopropyl ethoxyethyl sulfite. Calculated: S, 11.12%. Found: 10.55%.

Phenoxyethyl methoxyethyl sulfite. Calculated: S, 12.32%. Found: 12.00%.

p - tert. - Butylphenoxyisopropyl n-butoxyethyl sulfite. Calculated: S, 8.61%. Found: 8.30%.

p-tert.-Amylphenoxyethyl methoxyethyl sulfite. Calculated: S, 9.71%. Found: 9.70%.

p-tert.-Butylphenoxyisopropyl ethoxyethyl sulfite. Calculated: S, 17.79%. Found: 16.10%.

o-Toloxyethyl methoxyethyl sulfite. Calculated: S, 11.68%. Found: 10.90%.

Phenoxyisopropyl methoxyisopropyl sulfite. Calculated: S, 11.12%. Found: 10.32%.

EXAMPLE IV

This example illustrates the pre-emergence control of weeds.

To evaluate the chemicals of the invention as pre-emergent herbicides a measured amount (¼ teaspoon) of a mixture of weed seeds is spread evenly over the surface of a sandy-loam soil contained in a 6 inch pot. The weed seed mixture is made up of five broadleaved species, namely, pigweed (Amaranthus spp.), purslane (Portulaca spp.), quickweed (Galinsoga spp.), ragweed (Ambrosia spp.) and lambsquarters (Chenopodium spp.) and three grass types, namely crab grass (Digitaria spp.), barnyard grass (Echinochloa spp.) and foxtail (Setaria spp.). The seed is covered with ¼" to ⅛" of soil and the chemical dispersed in water is spread evenly over the soil surface. Application of 5 mg. and 40 mg. of chemical per pot is equivalent to rates of 2.5 lbs. and 20 lbs. per acre respectively. The pots are placed in the greenhouse in 6 inch saucers and waterings are made from the bottom. Duplicate pots are run for each chemical and the effectiveness of the compound is determined three weeks later by estimating the percent kill of the weeds compared to the untreated check pots. The weed control at various application rates against broadleaved weeds and grassy weeds of various chemicals of the present invention is shown in the following table:

| Chemical | Application Rate, lbs./acre | Percent Control | |
|---|---|---|---|
| | | Broad-leafed | Grassy |
| Phenoxyisopropyl methoxyethyl sulfite | 2.5 | 98 | 98 |
| Phenoxy-2-butyl methoxyethyl sulfite | 20 | 100 | 93 |
| Phenoxyisopropyl ethoxyethyl sulfite | 20 | 100 | 95 |
| Phenoxyethyl methoxyethyl sulfite | 20 | 100 | 45 |
| o-Toloxyethyl methoxyethyl sulfite | 20 | 100 | 100 |
| Phenoxyisopropyl methoxyisopropyl sulfite | 20 | 100 | 99 |

EXAMPLE V

This example illustrates the post-emergence control of weeds.

To evaluate the chemicals of the invention as post-emergent herbicides a measured amount (¼ teaspoon) of the weed seed used in Example I is spread evenly over the surface of a rich sandy-loam soil contained in a 4" x 4" x 4" box. The germinating seeds are maintained under a 16-hour light and an 8-hour dark exposure per 24-hour period and at a temperature of 75° F. for 10 days. At this time the broadleaved weed species are approximately 1½" tall and the grassy weed species have leaves 4" to 5" long. Duplicate boxes of weeds are sprayed to runoff with aqueous dispersions of the chemicals at a concentration of 2,000 parts per million, the aqueous dispersions containing a small amount, about 0.01%, of a surface-active dispersing agent which is a reaction product of ethylene oxide and an alkyl phenol. The effectiveness of the compounds is determined after 10 days by estimating the percent control of the weeds compared to the untreated check boxes. The weed control against broadleaved weeds and grassy weeds of various chemicals of the present invention is shown in the following table:

| Chemical | Percent Control | |
|---|---|---|
| | Broad-leaved | Grassy |
| Phenoxyisopropyl methoxyethyl sulfite | 85 | 70 |
| Phenoxy-2-butyl methoxyethyl sulfite | 100 | 90 |
| Phenoxyisopropyl ethoxyethyl sulfite | 95 | 97 |
| Phenoxyethyl methoxyethyl sulfite | 93 | 80 |
| o-Toloxyethyl methoxyethyl sulfite | 100 | 100 |
| Phenoxyisopropyl methoxyisopropyl sulfite | 93 | 88 |

EXAMPLE VI

The following illustrates the insecticidal activity of the chemicals of the invention in tests against the larvae of *Aedes aegypti* (L.) mosquitoes. Fourth instar larvae were used. These larvae normally reach this stage in 5 days at 80° F. after hatching.

To 10 mgs. of each chemical to be tested was added 1 ml. of acetone and 100 ml. of water to give a concentration of 100 parts per million (p.p.m.), and a portion was also diluted to 10 p.p.m.

Twenty-five ml. aliquots, replicated once, of each chemical to be tested at a concentration of 100 p.p.m. and of checks without the chemical and of plain water checks were placed in test tubes and from 5 to 25 larvae were added. The tubes were held at 70° F. in darkness for 72 hours. At the end of this period the live and dead larvae were counted and the percent mortality calculated. All the larvae were alive in the checks (percent mortality). The percent mortality of the larvae treated with the chemicals of the present invention is shown in the following table:

Chemical: Percent mortality
Phenoxyisopropyl methoxyethyl sulfite _____ 62
p-tert.-Butylphenoxyisopropyl n-butoxyethyl sulfite _____ 53
p-tert.-Amylphenoxyethyl ethoxyethyl sulfite __ 83
p-tert.-Butylphenoxyisopropyl ethoxyethyl sulfite 50
p-tert.-Butylphenoxyisopropyl methoxyethyl sulfite _____ 46
p - tert. - Butylphenoxyisopropoxyisopropyl methoxyethyl sulfite _____ 75

The chemicals of the present invention may be applied to the soil or to plants as a dust in admixture with a powdered solid carrier, such as the various mineral silicates, e.g., mica, talc, pyrophyllite and clays, or as a spray in aqueous suspension or solution, preferably with the addition of a surface-active dispersing agent. The chemicals of the invention may be applied as an aqueous emulsion prepared by dissolving in a suitable solvent such as kerosene, fuel oil, diesel oil or xylene containing a surface-active dispersing agent, and adding such concentrate to water. Such surface-active dispersing agent may be anionic, or cationic, as shown in U.S. Patent 2,556,665, columns 2 to 4. The chemicals of the invention may also be admixed with powdered solid carriers, such as mineral silicates, together with a small amount of such a surface-active dispersing agent so that a readily wettable powder may be obtainable which may be applied directly to plants, or which may be shaken up with water, to readily prepare a suspension of the chemical (and powdered carrier) in water for application in that form.

Having thus described our invention, what we claim and desire to protect by Letters Patent is:

1. A chemical represented by the general formula

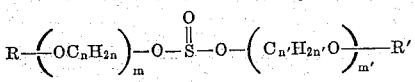

in which R is selected from the group consisting of phenyl, naphthyl, phenyl and naphthyl having substituents consisting of up to 5 halo radicals selected from the class consisting of chloro and bromo, and monosubstituted phenyl and naphthyl having the substituent selected from the group consisting of alkyl having up to 9 carbon atoms, cyclohexyl, chloromethyl and methoxy, and R' is selected from the group consisting of alkyl having up to 18 carbon atoms, allyl, methallyl, alkynyl having 3 to 10 carbon atoms, cyclohexyl, cyanoethyl, and chloroalkyl having up to 5 carbon atoms, and up to 3 chloro radicals, $n$ and $n'$ are each 2 to 10, and $m$ and $m'$ are each 1 to 10.

2. Phenoxyisopropyl methoxyethyl sulfite.
3. Phenoxy-2-butyl methoxyethyl sulfite.
4. Phenoxyisopropyl ethoxyethyl sulfite.
5. Phenoxyethyl methoxyethyl sulfite.
6. o-Toloxyethyl methoxyethyl sulfite.

References Cited by the Examiner
UNITED STATES PATENTS

| | | | |
|---|---|---|---|
| 2,665,204 | 1/54 | Swezey | 71—2.6 |
| 2,684,380 | 7/54 | Pechukas | 260—456 |
| 2,802,727 | 8/57 | Harris et al. | 260—456 |
| 2,819,211 | 1/58 | Mikesa et al. | 260—456 |
| 2,820,808 | 1/58 | Harris et al. | 260—456 |
| 2,913,324 | 11/59 | Kosmin | 71—2.6 |
| 2,978,477 | 4/61 | Linden | 260—456 |

CHARLES B. PARKER, *Primary Examiner.*